June 30, 1964 F. R. HAYS ETAL 3,139,340
CATHODE RAY TUBE FACE PLATES AND METHOD OF MAKING THE SAME
Filed Jan. 17, 1962 2 Sheets-Sheet 1

INVENTORS
FREDERICK R. HAYS
JOSEPH MAHLER
BY
Louis L. Vagner
ATTORNEY

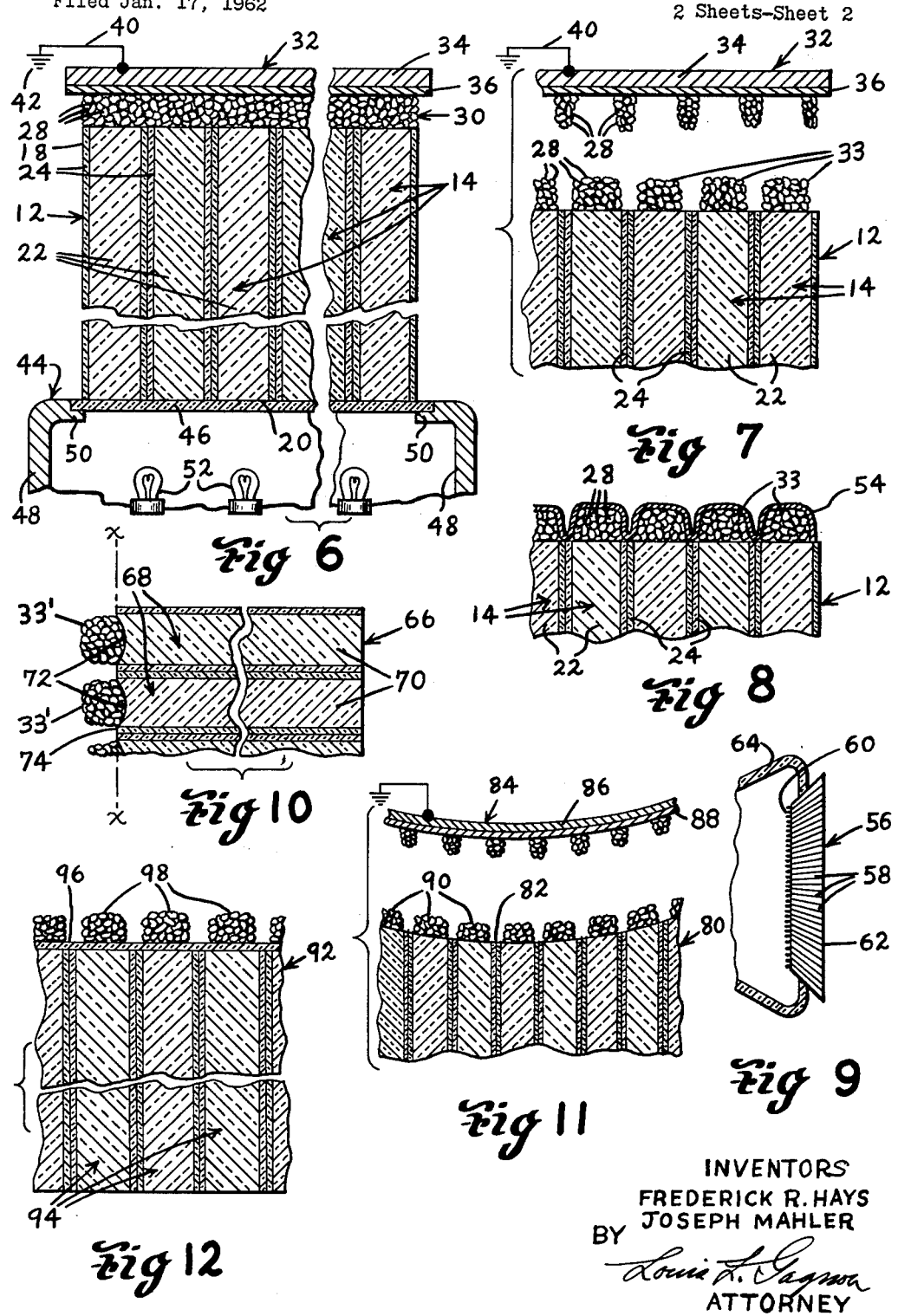

United States Patent Office 3,139,340
Patented June 30, 1964

3,139,340
CATHODE RAY TUBE FACE PLATES AND METHOD OF MAKING THE SAME
Frederick R. Hays, Woodstock, Conn., and Joseph Mahler, Fiskdale, Mass., assignors to American Optical Company, Southbridge, Mass., a voluntary association of Massachusetts
Filed Jan. 17, 1962, Ser. No. 166,882
10 Claims. (Cl. 96—1)

The invention relates generally to cathode ray tubes having face plates formed of a plurality of optical fibers secured together in side-by-side relation with each other and has particular reference to the provision of improved luminescent screens on such face plates and method of making the same.

A principal object of the invention is to provide a luminescent screen upon a side of a fiber optical type face plate structure wherein said screen comprises a plurality of individually isolated deposits or nodules of phosphor material located approximately coaxially with and upon an end of each of the optical fibers of said face plate and method of making the same.

Another object is to provide a luminescent screen upon a side of a fiber optical type face plate structure formed of a plurality of optical fibers having relatively large core parts surrounded by relatively thin claddings secured together in side-by-side relation with each other and wherein said screen comprises a plurality of nodules of phosphor material positioned upon substantially only the respective ends of said core parts at a side of said face plate structure and being separated from one another by substantially the full widths of said claddings surrounding said core parts of each of said optical fibers.

Another object is to provide a technique for accomplishing the above which is simple and economical to perform, and which offers an assurance of success in duplication.

Another object is to provide a process of the above character wherein the resultant phosphor deposits are of substantially uniform depth and density.

Another object is to provide an electrostatic photoconductive screen making technique which, in being a dry process, obviates the need for the usual liquid constituents in practices of this nature and offers the advantages of a neat, simple and reliable operation.

Other objects and advantages of the invention will become apparent from the following description when taken in conjunction with the accompanying drawings in which:

FIGS. 6 and 7 are diagrammatic illustrations of means and method for performing further steps in the process of the invention; and FIGS. 8, 9, 10 and 11 are illustrations of modifications of the invention.

Figure 1:
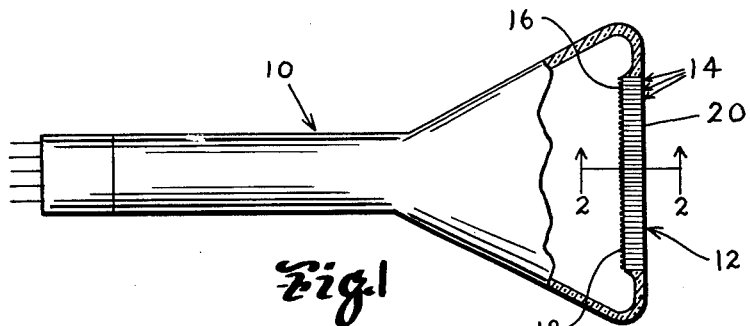
FIG. 1 is a partially broken-away side elevational view of a cathode ray tube having a fiber optical face plate and luminescent screen of the type relating to this invention.

Referring more particularly to the drawings wherein like characters of reference designates like parts throughout the various views, there is shown in FIG. 1 a cathode ray tube 10 having a face plate 12 formed of an assembly of optical fibers 14. A luminescent screen 16 of the type relating especially to this invention is provided upon one side 18 of the face plate 12 which, when bombarded with electrons, becomes luminescent to produce image information. This image information, in the form of light, is transferred through the optical fibers 14 to the opposite side 20 of the face plate 12 for viewing purposes or for purposes of exposing photosensitive papers, films, plates or the like which may be placed against the side 20 of the faceplate 12.

The luminescent screen 16 and method of making the same in combination with the fiber face plate 12 is the primary subject matter of this invention. Therefore, details of construction and operation of other parts of the cathode ray tube 10, which are conventional, will not be dealt with herein.

Figures 2, 3:
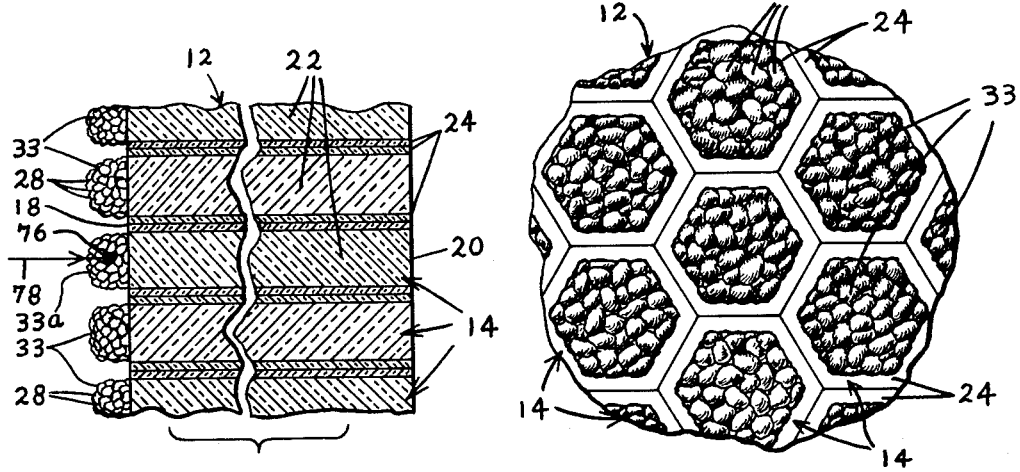
FIG. 2 is a greatly enlarged fragmentary cross-sectional view taken approximately along line 2—2 of FIG. 1 looking in the direction indicated by the arrows.
FIG. 3 is a greatly enlarged fragmentary plan view of the surface of the luminescent screen and fiber optical structure of the face plate shown in FIGS. 1 and 2.

Referring more particularly to the fiber optical structure of the face plate 12, it will be seen in FIG. 2 for example that the optical fibers 14 each embody a core part 22 formed of optical glass or the like having a relatively high index of refraction surrounded by a relatively thin cladding 24 of material having a relatively low index of refraction. The intent and purpose of such clad fibers is to enable the piping of high intensity light therethrough by the effect of so-called total internal reflection which results from such clad fibers. A typical fiber 14 might embody a core part 22 formed of optical flint glass or the like having an index of refraction of approximately 1.75 with a cladding 24 of crown or soda lime glass or the like having an index of refraction of approximately 1.52. The cladding 24 would preferably be of a thickness equal to approximately $\frac{1}{10}$ the overall maximum cross-sectional dimension of the fiber 14 but might, in some instances, vary considerably from this figure. It is also pointed out that the above-mentioned glasses have been given by way of illustration only and that other glasses having high indices of refraction such as those containing lanthanum or barium may be substituted for the above-mentioned flint glass. For example, a lanthanum containing glass having an index of refraction of approximately 1.69 surrounded by a glass having a lower index of refraction such as set forth above would be a suitable core glass for the fibers 14.

The fibers 14 may be of any desired cross-sectional size ranging from only a few microns in diameter to a few hundred microns. A preferred fiber size would be in the order of 4 or 5 microns in diameter. The selection of fiber sizes is actually made in accordance with the image resolving power desired of the face plate 12 wherein the smaller fibers produce face plates having higher powers of image resolution. The fibers ordinarily should not be so small as to approach the particular wavelength of light produced by the phosphor screen.

In forming the face plate 12, the fibers 14 are grouped in intimate side-by-side relation and fused or otherwise joined together in such manner as to produce a structure which is leakproof when subjected to the pull of a vacuum such as is conventionally provided within the envelope of the completed structure of the cathode ray tube. If desired, thin sealing layers of glass or the like may be provided over one or the other or both of the sides 18 or 20 of the face plate 12 to insure against leakage between the fibers 14. However, the use of such sealing layers is usually avoided wherever possible since vacuum tight fiber optical face plate structures which are formed without such sealing layers can be produced readily and are preferred. It will become apparent hereinafter that the use of transparent sealing layers on the face plate structures or the use of fibers 14 having different cross-sectional configurations than those shown in FIG. 3, such, for example, as round, oval, triangular and the like will not affect the process or alter the end result of the invention relating to the fabrication of the luminescent screen 16.

With particular reference to the forming of the luminescent screen 16 upon the fiber optical structure of the face plate 12 (which is accomplished before the face plate 12 is assembled with the main envelope portion 26 of the cathode ray tube 10), it is pointed out that the screen 16 is made up of particles of phosphor 28 (see FIG. 2 for example) which are selected from the many varieties thereof presently used in the fabrication of commercially known cathode ray tube screens. The phosphor particles 28 are selected or modified to be of a smaller size than the cross-sectional size of the ends of the optical fibers 14 to which they are to be applied and are further selected from the many commercially available types thereof so as to posses the particular characteristics of size, color, birghtness, stability and duration of phosphorescence desired of the screen 16. That is, other than the particular requirement for size, the phosphor particles 28 being of the readily available commercial variety, are selected in accordance with the standards followed in the fabrication of commercially known cathode ray tube screens.

Prior to the application for the phosphor particles 28 to the structure of the fiber face plate 12, the side 18 thereof which is to receive the same is provided with a finish such as to render it readily receptive to the passage of light into or out of the fibers 14. In order to accomplish this, the side 18 is ordinarily ground and optically polished but the use of a fine ground surface texture without polishing should not be ruled out. Either the fine ground or the optically polished surface treatment is applicable to this invention since the phosphor particles 28 which are used to make up the screen 16 are placed directly upon the side 18 and light directed from within the optical fibers 14 into the phosphor particles or vice versa will pass readily through either a fine ground or optically polished side 18. In all cases, however, the opposite side 20 of the fiber structure of the face plate 12 is preferably optically polished so as to be readily receptive to light which is directed therethrough into the fibers 14 during the forming of the screen 16 as will be described in detail hereinafter.

Figure 4:
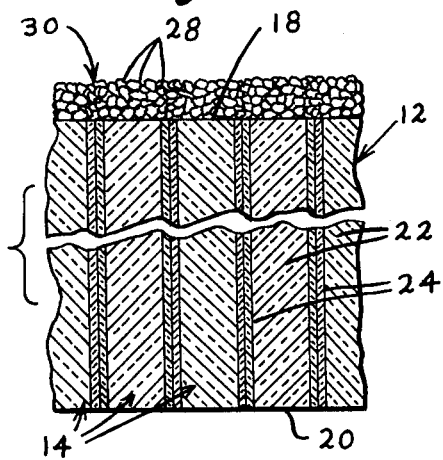
FIG. 4 is a view generally similar to FIG. 2 which illustrates an initial step in the process of forming the structure of the luminescent screen shown in FIGS. 1 and 2.

The screen 16 is formed upon the side 18 of the face plate by first placing a dense continuous layer 30 of the phosphor particles 28 upon said side 18 of the face plate 12 substantially in the manner illustrated in FIG. 4. The layer 30 should be of a thickness at least equal to the maximum thickness desired of the finished screen 16 which would preferably be approximately equal to a fiber 14 diameter. Thicker or thinner screens might be desirable in some instances and the layer 30 would, accordingly, be formed to the desired thickness. The layer 30 of phosphor particles 28 is applied to the face plate 12 by the well known technique of electrostatic deposition. Cataphoretic deposition or setling techniques may be used to form the layer 30. However, in view of the advantages of a dry process such as electrostatic deposition, cataphoretic or settling techniques which involve the use of electrolytes or suspension mediums for the phosphor particles are somewhat less desirable. If and when liquid suspension mediums are used in forming the layer 30, they must be removed so as to leave the phosphor particles 28 completely dry before proceeding to the next step of the process of the invention. Such liquids, if used, may be removed from the resultant layer 30 of phosphor particles 28 by allowing the layer to dry at room temperature or, in order to shorten the drying period, the layer may be heated in a conventional furnace or oven to a temperature of from 100° F. to 250° F. until dry.

Once the dry continuous layer 30 of densely packed phosphor particles 28 has been deposited upon the side 18 of the face plate structure 12, the phosphor particles 28 thereof which overlie the ends of the claddings 24 of the optical fibers 14 are removed photoelectrically while the major portion of the remaining phosphor particles which overlie the core parts 22 of the optical fibers are caused to remain in place thereon in the form of individual nodules 33 (see FIG. 2) completely isolated from one another by substantially the full width of the respective adjacent ends of the claddings 24 of the optical fibers 14.

Removal of the phosphor particles 28 from the areas over the ends of the claddings 24 is accomplished by placing an electrically charged photoconductive plate 32 upon or immediately adjacent the layer 30 of phosphor particles 28 are shown in FIG. 6 and exposing the areas of the plate 32 which overlie the ends of the core parts 22 of the optical fibers 14 to light which is directed into and through the fiber core parts 22 so as to discharge said areas of the plate 32. This leaves a charge pattern in the areas of the plate 32 which overlie the respective adjacent ends of the claddings 24 of the optical fibers 14, and, in so doing, the resultant charge pattern will attract the phosphor particles 28 (those disposed over the fiber claddings 24) and cause the same to electrically adhere to the plate 32 so that withdrawal of the plate from the layer 30 of phosphor particles will lift the electrically attracted phosphor particles away from the face plate structure 12 as illustrated in FIG. 7 leaving the above-mentioned phosphor nodules 33 only upon the core parts of the optical fibers 14.

Referring in more detail to the above briefly described photoelectric phosphor removal operation and to the structure of the plate 32 itself, it will be seen that the plate 32 comprises a relatively flat base 34 having a layer of photoconductive material 36 of substantially uniform thickness upon one side thereof. The base 34 is formed of sheet steel, aluminum, copper or any suitable electrical conducting material and the photoconductive layer 36 comprises a deposit of any suitable photoconductive material, such as selenium, cadmium sulfide, cadmium selenide, zinc oxide or the like.

In constructing the plate 32, the layer of photoconductive material 36 is deposited upon the base 34 by whatever technique is applicable to the particular type of photoconductive material which is selected for use. That is, selenium would be applied by a conventional evaporation process while the above-mentioned cadmium sulfide, cadmium selenide or zinc oxide types of photoconductive material would be deposited upon the base 34 in an organic adhesive such as nitrocellulose or methyl methacrylate or, alternatively, sintered in place. When using an organic adhesive such as mentioned above, the photoconductive material normally being in powdered form, would be suspended in said adhesive and applied to the base 34 by spraying or knife coating to a desired thickness such as one mil, for example, and thereafter air dried. When sintered in place, the photoconductive material would be placed upon the base 34 as a coating of the desired thickness and heated in a suitable conventional oven or furnace to a temperature of from 900° F. to 1300° F. for a time period of from approximately 10 to 30 minutes to fuse the particles to each other and to the base 34. The plate is formed to an overall size such as to be capable of completely covering the entire area of the layer 30 of phosphor particles 28 on the face plate 12 and, by way of example, the base 34 of the plate 32 might be approximately ⅛ of an inch thick with the photoconductive layer 36 being approximately one mil thick.

Figure 5:
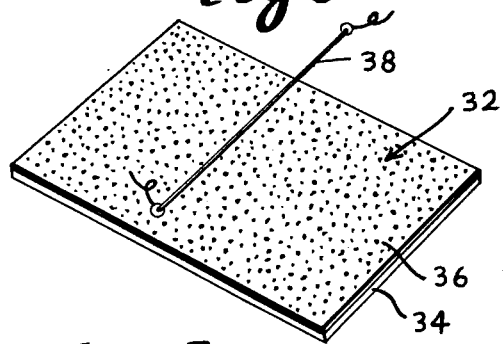
FIG. 5 is a perspective view of a photoconductive plate member used in the process of the invention and wherein means is also diagrammatically illustrated for electrostatically charging said plate member.

Once having formed the plate 32, its photoconductive layer 36 is provided with an electrostatic charge which for example may be induced by passing the plate 32 over or under an electrical current carrying conductor or wire 38 in the manner diagrammatically illustrated in FIG. 5. That is, with the wire 38 carrying several thousand volts (i.e., from 2 to 4 or 5 thousand volts) and the layer of photosensitive material 36 spaced approximately 2 or 3 inches from the wire 38 at all times, it is passed slowly from end to end beneath the wire 38. The corona discharge around the wire 38 produces ions which tend to deposit uniformly on the surface of layer 36. This uniform electrostatic charge will hold or not leak off while the plate is kept in darkness. That is, photoconductive materials such as mentioned hereinabove are substantially non-conductive when dark (i.e., not exposed to light) and will conduct an electrical charge or allow a charge induced thereon to leak through to ground when they are exposed to light. The reference to "darkness" or being "dark" herein is intended to refer to either the complete absence of light or the condition where the photosensitive layer 36 is not exposed to light which will render it conductive. That is, in some instances, it might be subjected to light of certain wavelengths which will not affect its conductivity.

It is pointed out that from the time the photoconductive plate is electrically charged as shown in FIG. 5, the operation of forming the phosphor nodules 33 on the plate 32 is carried out in darkness as will become apparent hereinafter. For example, if the photoconductive layer 36 is formed of cadmium sulfide or cadmium selenide, total darkness is required while in instances where the photoconductive layer is formed of selenium or zinc oxide conventional red photographic darkroom lights may be used without substantially affecting the conductivity of the layer 36.

With the photoconductive layer 36 of the plate 32 electrically charged as described above and placed against or immediately adjacent the layer 30 of phosphor particles 28 as shown in FIG. 6, the base 34 of the plate 32 is grounded by a suitable wire connection 40 to a ground 42 and the face plate structure is positioned with its side 20 upon a light box 44 or any suitable means by which light may be directed into the core parts of the optical fibers 14 through the side 20 of the face plate 12 without otherwise appreciably illuminating the photoconductive plate 32 as will be described in detail hereinafter. While various types of masks and lighting arrangements may be used to accomplish the above, the light box 44 which is shown for purposes of illustration consists of a glass plate 46 upon which the side 20 of the face plate 12 is rested. The glass plate 46 is supported by opaque side walls 48 of the box 44 which have an overturned upper lip 50 designed to receive and support the glass 46 and arranged to further function as masking means to prevent light produced within the box 44 from illuminating the external areas of the fact plate structure 12. Lamps 52 are provided within the box 44 to illuminate the optical fibers 14 through the glass plate 46. These lamps may be conventional incandescent light bulbs, mercury arc lamps, fluorescent tubes or photoflood lamps arranged so as to illuminate substantially only the core parts of the optical fibers as will be described in detail hereinafter.

With the arrangement just described, the optical fibers 14 are illuminated at the side 20 of the face plate structure 12 and ligh its transferred by the optical fibers 14 through their respective core parts 22 wherein it is emitted at the side 18 of the face plate structure 12. The light then penetrates through the layer 30 of phosphor particles 28 onto the photosensitive layer 36 of the plate 32. Thus, by the inherent ability of the clad optical fibers 14 to conduct light only through their core parts leaving their claddings 24 substantially dark, it can be seen that the photoconductive layer 36 of the plate 32 will be illuminated only in the areas which are disposed over the adjacent ends of the core parts 22 of the optical fibers 14 while being dark, or substantially so, throughout the areas thereof which overlie the claddings 24 of the optical fibers 14. In this manner, the illuminated areas of the photoconductive layer 36 will become inherently conductive while the dark areas thereof will remain substantially nonconductive and the electrostatic charge on the photoconductive layer 36 will leak away from the said conductive areas through the base 34 of the plate 32 and wire 40 to ground. Thus, the remaining charge pattern in the dark areas of the photoconductive layer 36 will attract the phosphor particles 28 adjacent thereto and cause them to cling or electrically adhere to the plate 32 which when lifted away from the face plate 12 as shown in FIG. 7 will remove substantially all phosphor particles 28 from the end areas of the claddings 24 leaving only the nodules 33 of phosphor particles generally as illustrated in FIG. 7.

It is pointed out that while under ordinary conditions of illumination, light will not generally enter or travel through the claddings of optical fibers of the above character, it is true that in instances where light rays might strike the ends of such claddings, glancingly, the claddings could become illuminated. This condition would obviously be detrimental to the end result of the invention and, accordingly, caution is taken by selection and arrangement of the lamps 52 to cause substantially all light therefrom to be directed straight on into the optical fibers 14 or at least along paths which are such as to enter the ends of the optical fibers 14 only within the aperture or maximum acceptance angle of the core parts 22 of the fibers 14. The aperture angle of an optical fiber such as 14 can be determined from the relationship sin $$\mu = \sqrt{n_1^2 - n_2^2}$$

wherein $\mu$ represents the aperture half angle, $n_1$ represents the index of refraction of the core glass and $n_2$ represents the index of refraction of the cladding glass. Collimated light directed substantially parallel to the axes of the optical fibers 14 is preferred in carrying out the process of the invention although, as it can be seen from the foregoing, it is not essential.

Once the phosphor particles 28 have been removed from the layer 30 thereof in the manner illustrated in FIG. 7 and described hereinabove, the face plate structure bearing the resultant phosphor nodules 33 is baked for a period of from 20 to 30 minutes at a temperature of from 400 to 420 degrees centigrade to cause the phosphor particles 28 to adhere to each other and to the glass of the face plate structure 12. Care is exercised in carrying out this baking step that the particles 28 of the nodules 33 are not displaced relative to each other.

The resultant fiber optical face plate having the screen 16 thereon is then edge fused or glass soldered in place upon the glass envelope of a cathode ray tube 10 such as shown by way of example in FIG. 1. The assembly may be made by any conventional technique and is usually done before the electrical components of the tube are placed in the neck portion of said envelope.

With the face plate 12 in assembled relation with a cathode ray tube as shown in FIG. 1 and with the tube 10 operating, an electron spot 76 (see FIG. 2) from an electron beam 78 which strikes and penetrates into a particular phosphor nodule 33a, for example, will inherently cause the phosphor particles 28 therein to become luminescent and give off light in all directions. Substantially all of this light which is directed toward the particular fiber core 22 having the illuminated nodule 33a thereon will pass into the said core and on through the fiber to the side 20 of the face plate 12. Other light from the immediate area of the electron spot 76 will be diffused within the phosphor nodule 33a and eventually reach and enter the adjacent fiber core or be dissipated by absorption within the nodule 33a. Only a very small percentage of light will reach and exit through the outer boundaries of the nodule 33a and of this small percentage of light which might find its way outwardly through the boundary of the particular nodule 33a only a negligible amount, if any, thereof would enter another adjacent nodule 33 and even less than this amount entering another nodule 33 would eventually find its way into the core part of another fiber 14. Thus, the screen construction 16 of the present invention provides substantially complete isolation of image light produced adjacent each respective fiber core so that image light intended to be transmitted by a particular fiber is practically completely prevented from illuminating its cladding or other adjacent fibers and the screen 16 provides the face plate 12 with an image resolving power substantially equal to that of its fiber size.

Before or after making the assembly of the face plate 12 and tube envelope, the screen 16 may be aluminized or otherwise coated as shown in FIG. 8 to improve its illuminating properties and to further more completely isolate the respective nodules 33 one from another.

Treatment of the screen 16 as shown in FIG. 8 embodies the provision of a metallic or other known light-reflecting coating 54 over the nodules 33 of phosphors. In accordance with the usual effect resulting from aluminizing phosphor screens, the coating 54 prevents back scattering of light and, in the present instance of surrounding the nodules 33, it additionally provides substantially complete isolation of light produced in each particular nodule 33 and aids in keeping the nodules 33 intact. The coating 54, like all such coatings on conventional phosphor screens is of low mass so that the electron beam is not appreciably attenuated in penetrating the same.

The coating 54 is applied to the screen 16 in the manner of similarly treating conventional continuous phosphor screens. That is, a thin layer of cellulose nitrate in a volatile solvent is first applied to the phosphor nodules 33 so as to completely cover the same and fill in the irregularities on the outer surface thereof. The organic cellulose nitrate coating is then air dried and the metallic coating (preferably aluminum) is evaporated to a desired thickness (approximately from 0.01 to 1 micron) upon the resultant relatively smooth outer surface of the cellulose nitrate coating. Finally, the cellulose nitrate coating is burned out by again baking the face plate for from 15 to 45 minutes at a temperature of from 350° C. to 450° C. in a conventional furnace or oven or the like. Removal of the cellulose nitrate avoids the possibility of gases being formed therefrom during operation of the cathode ray tube which is to receive the particular face plate so treated. Also the resultant relatively smooth inner surface of the metallic coating 54 provides highly reflective means for containing light produced by the phosphors 28 within their respectively coated nodules 33 and further, by such light-reflecting action, causes an increased amount of illumination to be directed toward and to enter the respective core part of the fiber 14 to which its particular nodule 33 is attached. In addition, the aluminum coating 54 which is continuous and overlies the cladding parts of the optical fibers 14, functions to conduct away any space charge which would decrease the electron velocity and the resultant phosphor brightness.

From the above it can be seen that the screen 16 either with or without the metallic coating 54 (see FIGS. 2 or 8) is comprised of isolated phosphor nodules, each and every one of which is disposed in precise registry over and upon a respective one of the optical fibers 14 and separated from one another by the thickness of the fiber claddings 24. This construction provides the ultimate in fiber optical face plates intended for use in cathode ray tubes and the process of the invention is applicable to fiber face plate structures formed of fibers of all shapes and sizes with an assurance of duplication when mass produced.

While fibers of substantially uniform cross-sectional sizes throughout their length have been shown and thus far described for purposes of illustrating the process of the invention, it is to be understood that a tapered face plate 56 formed of tapered clad optical fibers 58 may be provided with a phosphor screen 60 which is identical to the screen 16 described hereinabove (see FIG. 9). Furthermore, such a face plate 56 might be arranged to have its larger face 62 disposed within the cathode ray tube envelope in which case the screen 60 would be applied to said larger face. That is, the screen 60 may be provided on either the smaller or the larger faces of the face plate 56 depending upon which face thereof is to be ultimately disposed within the cathode ray tube envelope 64. In applying such a phosphor screen to a tapered fiber optical face plate, the above-outlined process for fibers of uniform diameters would be followed. Furthermore, as shown in FIG. 10, phosphor screens such as 16 or 60 may be applied to a fiber face plate structure 66 whose optical fibers 68 have core parts 70 which are recessed as by etching or the like in the manner indicated by the reference numeral 72. This allows a somewhat thicker build-up of the resultant phosphor nodules 33' without extending the same beyond the general plane $x$—$x$ of the face 74 which receives the phosphor nodules 33'.

It is pointed out that, in instances where the fiber structure of a face plate such as 80 in FIG. 11 embodies a curved surface 82 which is to be provided with a luminescent screen such as described hereinabove, a photoconductive plate 84 which is curved to match the curvature of the surface 82 would be used to carry out the process of the invention. The photoconductive plate 84, other than being curved, is identical to the plate 32 described hereinabove and embodies a base 86 of electrical conducting material and a layer 88 of photoconductive material. In forming the nodules 90 of phosphor particles on the curved surface 82 of the face plate 80 with the photoconductive plate 82, the procedure described hereinabove with relation to the photoconductive plate 32 would be followed. That is, in all respects, the process of forming the nodules 90 of phosphor upon the face plate 80 is identical to that used for forming the nodules 33 upon the face plates 12, 56 or 66 described hereinabove.

In FIG. 12 there is illustrated a fiber face plate structure 92 wherein the ends of the optical fibers 94 thereof are covered by a thin layer of glass 96 which, as mentioned hereinabove, is provided as a seal to render the face plate structure 92 vacuum tight. In this instance, the nodules 98 of phosphor are formed upon the layer 96 of the sealing glass rather than directly upon the ends of the optical fibers 94. The phosphor nodules 98 are identical to the nodules 33 described hereinabove and the process of forming the nodules 98 is identical to that used in forming said nodules 33.

From the foregoing, it can be seen that novel means and method have been provided for accomplishing all of the objects and advantages of the invention. Nevertheless, it should be apparent that many changes in the details of construction, arrangement of parts or steps of the method may be made without departing from the spirit of the invention as expressed in the accompanying claims. The invention, therefore, is not to be limited to the exact matters shown and described as only preferred matters have been given by way of illustration.

Having described our invention, we claim:

1. The method of forming isolated areas of a coating material on a side surface of an optical component comprising a number of energy-conducting fibers arranged in spaced side-by-side relationship with the corresponding one ends of said fibers constituting said side surface, said method comprising the steps of applying a uniform coating of said coating material on said side surface of said optical component, placing over said coating a member having a substantially uniform electrostatic charge over its surface area adjacent said coating adapted to attract and cause said coating material to electrically adhere to said member, discharging said member throughout isolated areas thereof disposed only over the ends of said fibers in said surface to release corresponding portions of said coating from said member while retaining said charge on said member throughout remaining areas thereof and moving said member away from said optical component to carry therewith coating material electrically adhered to said remaining areas of said member.

2. The method of forming isolated areas of energy-converting material on a side surface of an optical component comprising a number of energy-conducting fibers arranged in side-by-side relationship with corresponding one ends of said fibers forming said side surface, said method comprising providing a layer of said energy-converting material on said side surface of said optical component, placing an electrically grounded photo-conductive member having an electrostatic charge thereon in overlying relation with said layer of energy-converting material, directing light through said fibers and layer of energy-conducting material onto said photo-conductive member to cause said electrostatic charge to be dissipated throughout parts of said photo-conductive member disposed over said one ends of said fibers and moving said member away from said layer of energy-converting material to cause other parts of said member in which the electrostatic charge remains to remove a substantial amount of said energy-converting material which surrounds said one ends of said fibers to form said isolated areas of energy-converting material.

3. The method of forming a luminescent screen of the character described upon one side of a fiber optical structure embodying a plurality of optical fibers each having a core part and an integral cladding surrounding the sides of said core part and wherein said optical fibers are intimately bundled together in side-by-side relation with each other, said method comprising placing a continuous layer of phosphor particles upon one side of said fiber optical structure in overlying relation with the ends of said optical fibers, placing over said layer of phosphor particles and in immediate adjacent relation therewith a member having an electrostatic charge thereon adapted to attract and electrically adhere said phosphor particles thereto, causing the electrostatic charge to be dissipated in the portions of said member which are disposed over said core parts of said optical fibers to release the respective adjacent phosphor particles from attraction to said member while retaining said charge on said member substantially throughout its remaining portions which are disposed over said cladding parts of said fibers and moving said member away from said fiber optical structure to carry the phosphor particles disposed over said claddings along with said member and thereby remove the same from said fiber optical structure.

4. The method of forming a luminescent screen of the character described upon one side of a fiber optical structure embodying a plurality of optical fibers each having a core part and an integral cladding surrounding the sides of said core part wherein said optical fibers are intimately bundled together in side-by-side relation with their respective opposite ends compositely forming opposite sides of said fiber optical structure, said method comprising depositing a continuous layer of phosphor particles upon one of said sides of said fiber optical structure in such manner as to extend said layer over the major portion of said side thereof, placing over said layer of phosphor particles and in immediate adjacent relation therewith, a member having an electrostatic charge thereon adapted to attract and electrically adhere said phosphor particles to itself, causing the electrostatic charge to be dissipated in the portions of said member which are disposed over said core parts of said optical fibers to release the respective adjacent phosphor particles from attraction to said member while retaining said charge on said member substantially throughout its remaining portions which are disposed over said cladding parts of said fibers, moving said member away from said optical structure to carry therewith the remaining portion of said phosphor particles initially disposed over said claddings of said fiber optical structure and heating said fiber optical structure to a temperature and for a time period sufficient to cause said phosphor particles remaining thereon to become attached to each other and to said fiber optical structure.

5. The method of forming a luminescent screen upon a side of a face plate structure embodying a plurality of individually clad light-conducting fibers arranged in intimate side-by-side relation with each other and with the respectively adjacent opposite ends of said fibers compositively forming first and second sides of said face plate structure, said method comprising placing a continuous layer of phosphor particles upon said first side of said face plate structure, positioning a grounded electrostatically charged photo-conductive member in adjacent superimposed relation with said layer of phosphor particles, directing light into said fibers at the second side of said structure in such manner as to cause said light to be transferred through said fibers and layer of phosphor particles substantially without internally illuminating the claddings of said fibers or the areas of said photo-conductive member which are disposed over said claddings while, at the same time, causing illumination of the remaining areas of said photo-conductive member to render said remaining areas conductive whereby the electrostatic charge in said remaining areas of said member will leak off to ground leaving a pattern of charge in said photo-conductive member adapted to attract and electrically adhere phosphor particles of said layer thereto substantially only in said areas thereof disposed over said claddings of said fibers and moving said photo-conductive member away from said face plate structure to remove from said face plate structure substantially only the phosphor particles electrically adhered to said charge pattern.

6. The method of producing a luminescent screen of the character described upon a side of a face plate structure formed of a plurality of light-conducting fibers each having a core part and a relatively thin surrounding cladding thereon with said fibers being arranged in intimate side-by-side relation wherein the respective adjacent opposite ends of said fibers compositely form respectively opposite sides of said face plate structure, said method comprising placing a continuous layer of phosphor particles upon a first of said sides of the face plate structure, providing a grounded plate-like photo-conductive member initially having a substantially uniformly distributed electrostatic charge thereon adapted to be discharged to ground when exposed to light and to normally attract and cause said phosphor particles to electrically adhere thereto when not exposed to light, placing said member in adjacent superimposed relation with said layer of phosphor particles, directing light into the core parts of said fibers at the second side of said face plate structure without causing appreciable intrenal illumination of said claddings while causing said light to be transferred through said core parts of said fibers and the adjacent particles of phosphor on said first side of said face plate structure onto the respective portions of said photo-conductive member which are disposed over said core parts whereby said photo-conductive member will become conductive in said portions disposed over said core parts of said fibers and remain substantially non-conductive throughout said other portions thereof and said electrostatic charge on said portions rendered conductive will leak off to ground leaving an electrostatic charge pattern substantially only throughout said other portions disposed over said claddings of said fibers to which substantially only the adjacent phosphor particles will electrically adhere and moving said photo-conductive member away from said face plate structure to remove the phosphor particles electrically adhered thereto from said face plate structure leaving substantially only the phosphor particles thereon which are disposed over said core parts of said fibers.

7. The method of forming a luminescent screen upon one side of a fiber optical structure embodying a plurality of optical fibers each having a core part of relatively high index of refraction and an integral relatively thin cladding of material having a relatively low index of refraction surrounding the sides of said core part and wherein said optical fibers are intimately bundled together in side-by-side relation with each other with their respective opposite end faces compositely providing said fiber optical structure with oppositely disposed side surfaces, said method comprising placing a continuous layer of phosphor particles upon one of said side surfaces of said fiber optical structure, providing a plate-like member having a photo-conductive surface on one side thereof and means on its opposite side for electrically grounding said photo-conductive surface, said photo-conductive surface being characterized to be substantially non-conductive to an electrical charge when dark and conductive to such a charge throughout areas thereof which are exposed to light, producing an electrostatic charge on said photo-conductive surface of said plate-like member in an environment of substantial darkness, placing said member over said layer of phosphor particles with said electrostatically charged photo-conductive surface retained substantially in darkness and disposed adjacent said phosphor particles to electrostatically attract said phosphor particles to said plate-like member, illuminating said other side surface of said fiber optical structure in such manner as to cause light to enter said core parts of said optical fibers substantially without entering said claddings whereby said light will be transferred through said core parts of said optical fibers and through said layer of phosphor particles onto the portions of said photo-conductive surface of said plate-like member which are disposed over said core parts of said optical fibers and cause said portions of said photo-conductive surface to become conductive and the electrostatic charge thereon to leak off to ground substantially without illuminating and rendering the remaining portions of said photo-conductive surface conductive, the phosphor particles disposed over said core parts of said fibers thereby being released from said electrostatic attraction to said photo-conductive surface of said plate-like mmber and moving said plate-like member away from said layer of phosphor particles to withdraw from said face plate structure substantially only the phosphor particles remaining electrostatically attracted to said plate-like member throughout the portions of said layer thereof initially disposed over said claddings of said optical fibers.

8. The method of forming a luminescent screen of the character described upon one side of a fiber optical structure embodying a plurality of optical fibers each having a core part and an integral cladding surrounding the sides of said core part and wherein said optical fibers are intimately bundled together in side-by-side relation with each other, said method comprising placing a continuous layer of phosphor particles upon one side of said fiber optical structure in overlying relation with the ends of said optical fibers, electrostatically removing the major portion of the phosphor particles disposed over said claddings of said optical fibers from said side of said fiber optical structure substantially without removing the phosphor particles disposed over said core parts of said fibers, heating said fiber optical structure and phosphor particles remaining thereon to a temperature and for a period of time sufficient to cause said remaining phosphor particles to adhere to each other and to said fiber optical structure and applying a continuous relatively thin metallic coating over said remaining phosphor particles.

9. The method of forming a luminescent screen of the character described upon one side of a fiber optical structure embodying a plurality of optical fibers each having a core part and an integral cladding surrounding the sides of said core part and wherein said optical fibers are intimately bundled together in side-by-side relation with each other, said method comprising placing a continuous layer of phosphor particles upon one side of said fiber optical structure in overlying relation with the ends of said optical fibers, placing over said layer of phosphor particles and in immediate adjacent relation therewith a member having an electrostatic charge thereon adapted to attract and electrically adhere said phosphor particles thereto, causing the electrostatic charge to be dissipated in the portions of said member which are disposed over said core parts of said optical fibers to release the respective adjacent phosphor particles from attraction to said member while retaining said charge on said member substantially throughout its remaining portions which are disposed over said cladding parts of said fibers, moving said member away from said fiber optical structure to carry the phosphor particles disposed over said claddings along with said member to remove the same from said fiber optical structure, heating said fiber optical structure and the phosphor particles remaining thereon to a temperature and for a time period sufficient to cause said remaining phosphor particles to become attached to each other and to said fiber optical structure and applying a continuous relatively thin metallic coating over said remaining phosphor particles.

10. The method of forming a luminescent screen upon one side of a fiber optical structure embodying a plurality of optical fibers each having a core part of relatively high index of refraction and an integral relatively thin cladding of material having a relatively low index of refraction surrounding the sides of said core part and wherein said optical fibers are intimately bundled together in side-by-side relation with each other with their respective opposite end faces compositely providing said fiber optical structure with oppositely disposed side surfaces, said method comprising placing a continuous layer of phosphor particles upon one of said side surfaces of said fiber optical structure, providing a plate-like member having a photo-conductive surface on one side thereof and means on its opposite side for electrically grounding said photo-conductive surface, said photo-conductive surface being characterized to be substantially non-conductive to an electrical charge when dark and conductive to such a charge throughout areas thereof which are exposed to light, producing an electrostatic charge on said photo-conductive surface of said plate-like member in an environment of substantial darkness, placing said member over said layer of phosphor particles with said electrostatically charged photo-conductive surface retained substantially in darkness and disposed adjacent said phosphor particles to electrostatically attract said phosphor particles to said plate-like member, illuminating said other side surface of said fiber optical structure in such manner as to cause light to enter said core parts of said optical fibers substantially without entering said claddings whereby said light will be transferred through said core parts of said optical fibers and through said layer of phosphor particles onto the portions of said photo-conductive surface of said plate-like member which are disposed over said core parts of said optical fibers and cause said portions of said photo-conductive surface to become conductive and the electrostatic charge thereon to leak off to ground substantially without illuminating and rendering the remaining portions of said photo-conductive surface conductive, the phosphor particles disposed over said core parts of said fibers thereby being released from said electrostatic attraction to said photo-conductive surface of said plate-like member, moving said plate-like member away from said layer of phosphor particles to withdraw from said face plate structure substantially only the phosphor particles remaining electrostatically attracted to said plate-like member throughout the portions of said layer thereof initially disposed over said claddings of said optical fibers, heating said fiber optical structure and the phosphor particles left thereon to a temperature and for a period of time sufficient to cause said phosphor particles to adhere to each other and to said fiber optical structure and applying a continuous relatively thin metallic coating over said phosphor particles.

References Cited in the file of this patent

UNITED STATES PATENTS

| | | |
|---|---|---|
| 2,682,478 | Howse | June 29, 1954 |
| 2,839,400 | Moncrieff-Yeates | June 17, 1958 |
| 2,983,835 | Frey | May 9, 1961 |
| 2,992,107 | Kaplan et al. | July 11, 1961 |
| 3,007,049 | McNaney | Oct. 31, 1961 |
| 3,041,228 | MacLoed | June 26, 1962 |